United States Patent [19]
Kitamura

[11] Patent Number: 5,351,376
[45] Date of Patent: Oct. 4, 1994

[54] MACHINE TOOL

[75] Inventor: Koichiro Kitamura, Takaoka, Japan

[73] Assignee: Kitamura Machinery Co., Ltd., Japan

[21] Appl. No.: 938,142

[22] PCT Filed: Feb. 27, 1992

[86] PCT No.: PCT/JP92/00216
§ 371 Date: Oct. 23, 1992
§ 102(e) Date: Oct. 23, 1992

[87] PCT Pub. No.: WO92/15424
PCT Pub. Date: Sep. 17, 1992

[30] Foreign Application Priority Data
Mar. 1, 1991 [JP] Japan .................. 3-119585

[51] Int. Cl.⁵ .................. B23P 23/02; B23Q 11/10
[52] U.S. Cl. .................. 29/27 C; 279/20;
82/900; 29/569; 29/DIG. 88; 408/61; 409/136
[58] Field of Search .................. 409/136; 408/59, 60,
408/61, 20, 21; 279/20; 29/27 R, 27 C, 560,
DIG. 88, 40; 82/900

[56] References Cited

U.S. PATENT DOCUMENTS

| | | | |
|---|---|---|---|
| 3,893,355 | 7/1975 | Maastricht | 279/20 X |
| 4,557,643 | 12/1985 | Cioci | 408/59 X |
| 4,570,313 | 2/1986 | Holmstrom et al. | 29/27 CX |
| 4,573,836 | 3/1986 | Andersson | 408/59 |
| 4,929,130 | 5/1990 | Diebolt et al. | 409/136 |
| 4,981,403 | 1/1991 | Katayama | 409/136 |

FOREIGN PATENT DOCUMENTS

| | | | |
|---|---|---|---|
| 0276246 | 2/1990 | Fed. Rep. of Germany | 408/61 |
| 0292344 | 12/1987 | Japan | 408/61 |

Primary Examiner—Z. R. Bilinsky
Attorney, Agent, or Firm—Lorusso & Loud

[57] ABSTRACT

A machine tool comprising:
a toolholder for holding a tool;
a spindle for detachably supporting the toolholder;
a spindle support for rotatably supporting the spindle;
a drive means for driving the spindle supported on the spindle support;
a stop means for preventing the toolholder from rotating relative to the spindle support; and
a cutting oil supply means for supplying a cutting oil to the tool via the stop means.

7 Claims, 9 Drawing Sheets

5,351,376

MACHINE TOOL

TECHNICAL FIELD

This invention relates to a machine tool for complex machining.

BACKGROUND ART

When a cylindrical workpiece is, for example, intended to be turned and thereafter drilled, the workpiece is first set in the chuck of a lathe for turning with a cutting tool engaging its circumference. Then the work piece is detached from the lathe and reset on a drilling machine for drilling.

In this procedure the workpiece must be detached from the lathe and reset on the drilling machine. It takes time to detach and reset the workpiece. It is hard to machine the workpiece with high accuracy.

DISCLOSURE OF INVENTION

An object of this invention is to provide a machine tool in which a workpiece once being set can be machined in various manners without seizure of tools.

A machine tool according to this invention includes a tool-holder for holding a tool; a spindle for detachably supporting the toolholder; a spindle support for rotatably supporting the spindle; drive means for driving the spindle supported on the spindle support; stop means for preventing the toolholder from rotating relative to the spindle support; and a cutting oil supply means for supplying a cutting oil to the tool via the stop means.

In a machine tool according to this invention the stop means includes a member for attaching the tool to the toolholder; a positioning member mounted on the spindle support; a stop member mounted on the member for preventing the toolholder from rotating in such a manner that the stop member engages the positioning member and fixes the toolholder relative to the spindle support when the toolholder is supported in the spindle.

In a machine tool according to this invention, the cutting oil supply means has preferably a discharge member, the discharge member having a nozzle and mounted on the member.

DESCRIPTION OF THE PREFERRED EMBODIMENTS

Figure 1:
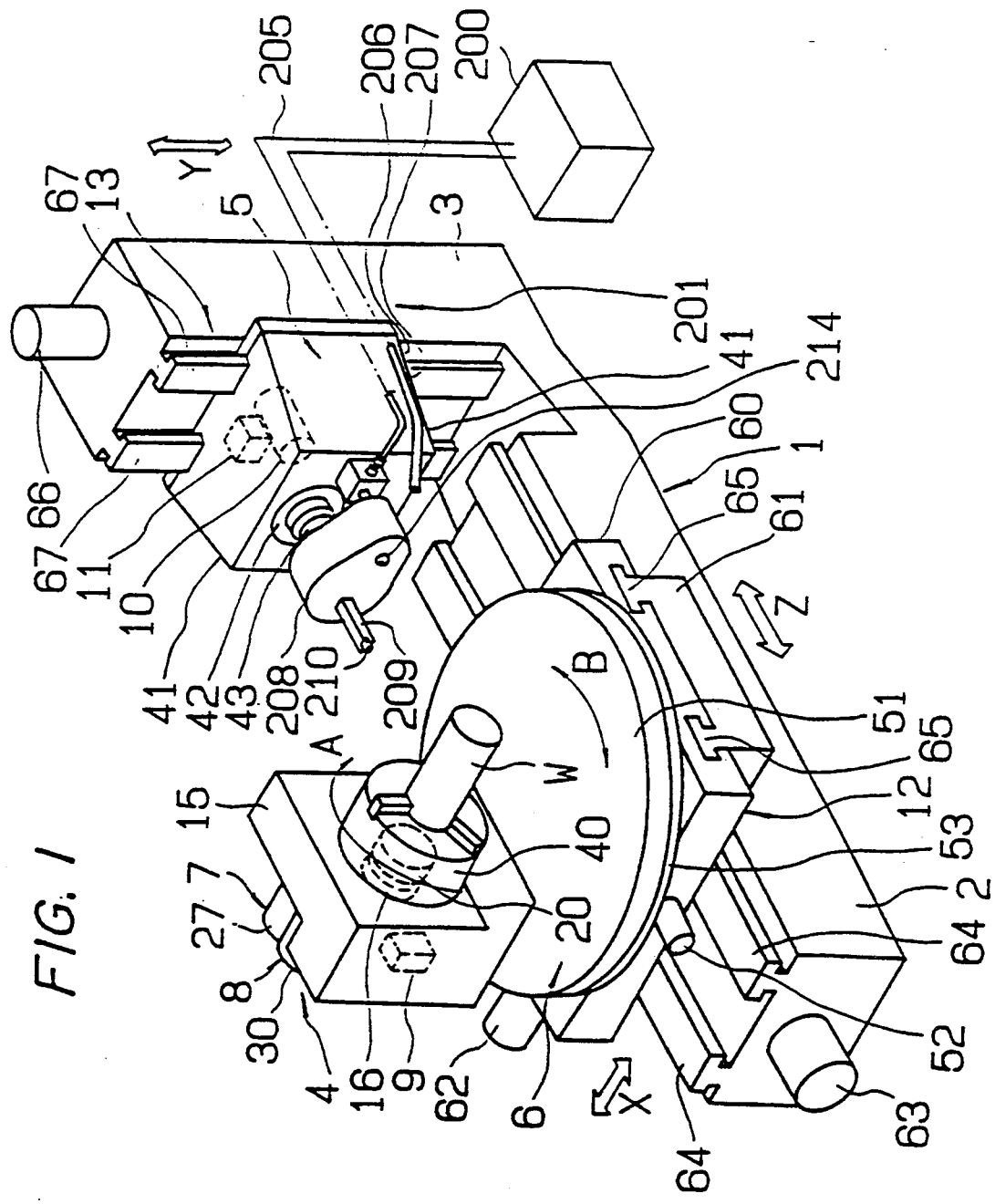
FIG. 1 is a perspective view showing a machine tool according to the invention.

Referring to FIG. 1, a machine tool according to this invention comprises a main body 1, a workhead 4, a toolhead 5, a first index part 6, a first drive part 7, a second index part 8, a first prevention part 9, a second drive part 10, drive systems 12, 13, a tank for cutting oil 200, a supply device for cutting oil 201.

The main body 1 has a bed 2 and column 3.

Figure 2:
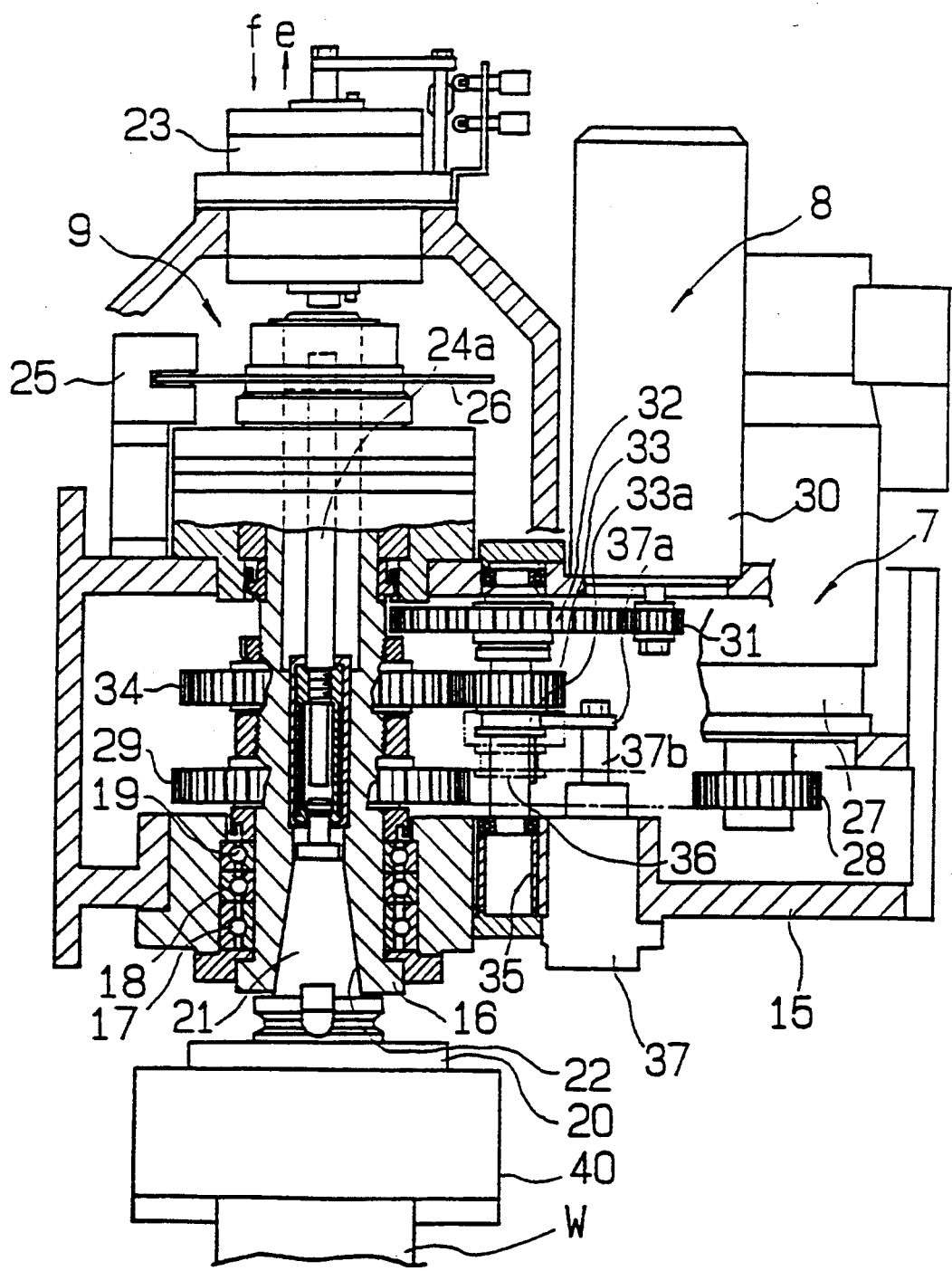
FIG. 2 is a view showing an interior construction of a workhead.

Referring to FIGS. 1, 2, a casing 15 of the workhead 4 supports the first drive part 7, the second index part 8 and the first prevention part 9. A spindle 16 is rotatably supported on the casing 15 by bearings 17–19. A workholder 20 is detachably supported in the spindle 16 in a conventional collet chuck manner.

The workholder 20 has a tapered portion 21 corresponding to a mounting hole 22 of the spindle 16.

A rod 24a of an oil device 23 can be moved in a direction e to fix the tapered portion 21 of the workholder 20 in the mounting hole 22. The tapered portion 21 can be detached from the mounting hole 22 by moving the rod 24a in direction f.

The first prevention part 9 is located near the other end of the spindle 16. The first prevention part 9 comprises a hydraulic brake device 25 and a rotor 26. The brake device 25 is mounted on the casing 15. The rotor 26 is attached to the other end of the spindle 16. The rotating rotor 26, or the spindle 16, can be stopped by the brake device 25 on request.

The first drive part 1 comprises a motor 27, gears 28, 29 and so on. The gear 28 is fixed to an output shaft of the motor 27. The gear 29 is fixed to the spindle 16. Driving power can be transmitted between the gears 28 and 29 by way of gears (not shown) and so forth. When the motor 27 is driven the spindle 16 is continuously rotated.

The second index part 8 comprises an index motor 30, gears 31, 32, 33, 34, a slide mechanism 35, a shaft 36. The gear 32 is fixed to the shaft 36. The gear 32 engages the gear 31, while the gear 33 engages the gear 34. The spindle 16 can be indexed, for example every 10 degrees or 1 degree, in direction A by motor 30.

The gear 33 can slide only in the axial direction of the shaft 36. A lever 37a of the slide mechanism 35 engages a portion 33a of the gear 33, so that the gear 33 slides along the shaft 36 when a rod 37b of a cylinder 37 is retracted to disengage the gear 33 from the gear 34. In other words, the driving power of the motor 30 is not transmitted to the spindle 16. Therefore, in case the spindle 16 is continuously rotated by the motor 27 the motor 30 remains standing causing no damage. The motor 30 is, for example, a servomotor.

The workholder 20 shown in FIG. 2 has a conventional air chuck 40. A cylindrical workpiece is clamped in the air chuck 40.

Referring to FIG. 1, casing 41 of the toolhead 5 houses a spindle 42, a second prevention part 11 and a second drive part 10.

The spindle 42 is the same type as the spindle 16 of workhead 4. The toolholder 43 is detachably supported in the spindle 42 by a conventional collet chuck. The second drive part 10 has a motor, gears and so on for continuously rotating the spindle 42.

The first index part 6 shown in FIG. 1 is mounted on a saddle 60 of the drive system 12. The first index part 6 has a rotational disk 51, a fixed disk 53 and a motor 52. Workhead 4 is fixed on the rotational disk 51. The rotational disk 51 can be indexed in direction B by a motor 52. A conventional mechanism is used for this purpose.

The drive systems 12, 13 move the workholder 4 and the toolholder 5 relative to each other.

The drive system 12 includes a saddle 60, a saddle 61, motors 62, 63, and a guide 64. The saddle 61 is moved along the guides 64, 64 on the bed in a direction z when the motor is driven, while the saddle 60 is moved along the guide 65 on the saddle 61 in a direction x.

The drive system 13 has a motor 66 and a guide 67. The toolholder 5 is moved in a direction y when the motor 66 is driven.

Figure 4:
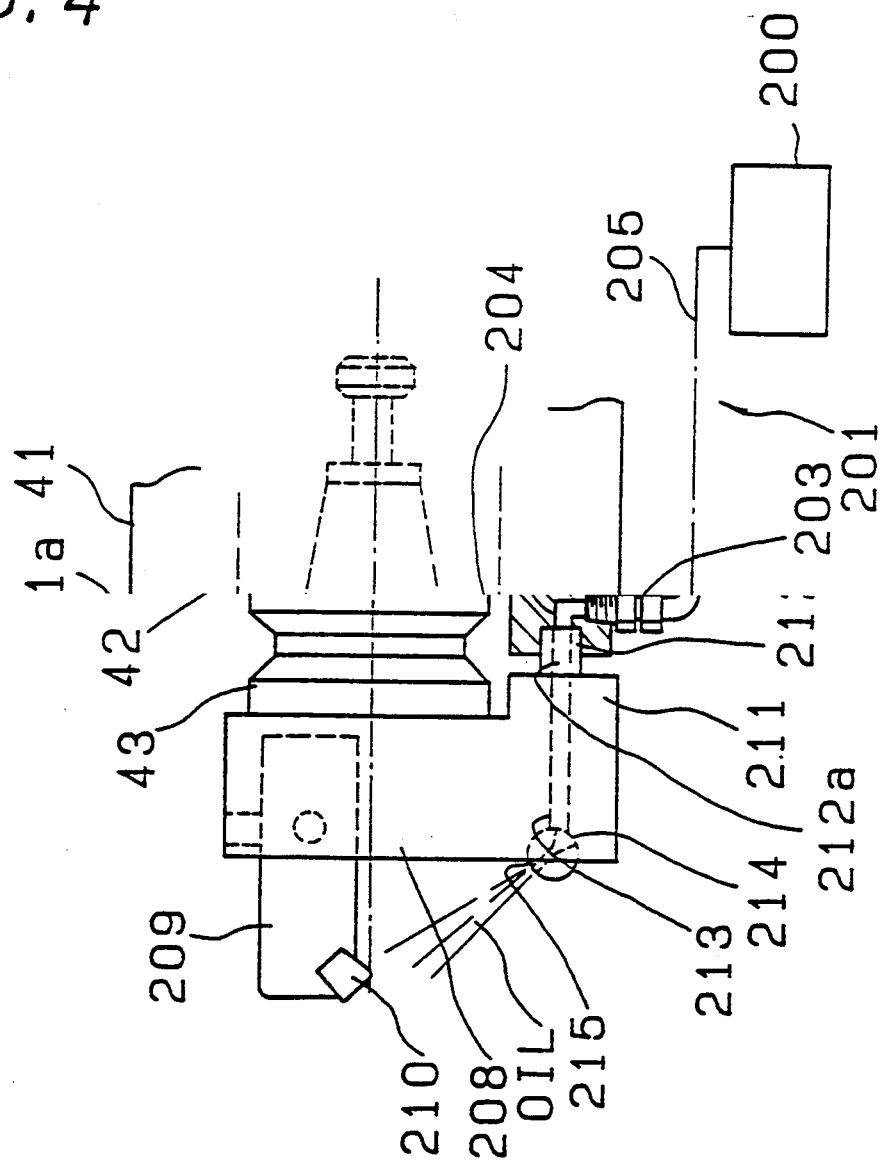
FIG. 4 is a side view showing a toolholder and the peripheral members.
Figure 5:
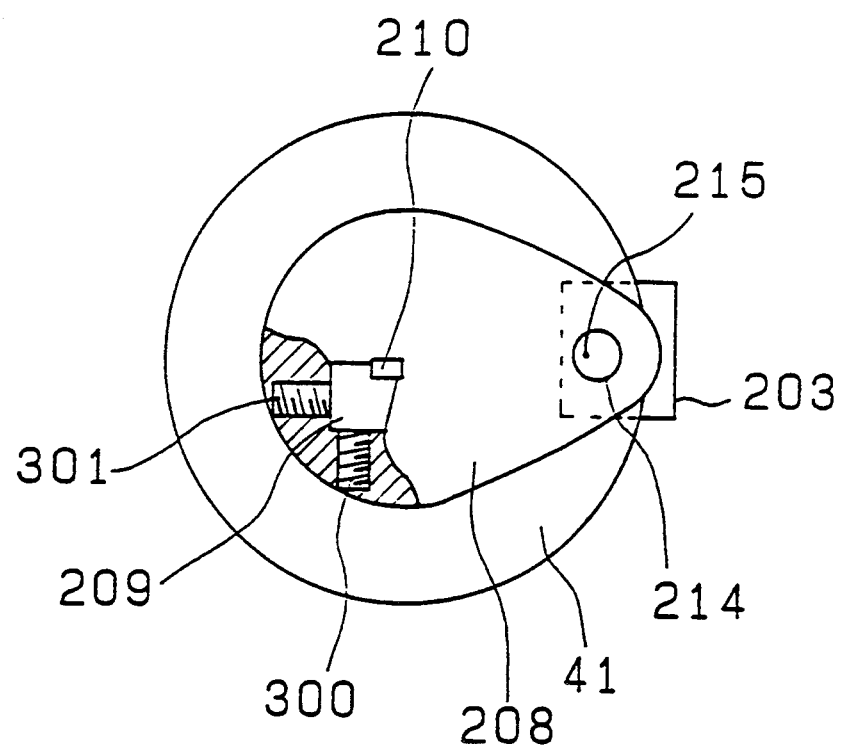
FIG. 5 is a front view showing a toolholder and the peripheral members.

Now the toolholder 43, a rotation prevention means and a cutting oil supply device 201 will be explained with reference to FIGS. 1, 4 and 5.

The toolholder 43 which may be called a biteholder, is inserted into the spindle 42. A positioning block 203 is detachably mounted on an endcover 41a. This block 203 has a L-shaped channel 204 formed therein. A cutting oil line 205 is connected to the channel 204 at one end thereof, while at the other end the cutting oil line 205 is connected to a tank 200. Another cutting oil line 206 is provided if needed as shown in FIG. 1. The cutting oil line 206 has a discharge opening 207 at one end thereof, while at the other end it is connected to the tank 200.

A member 208 is attached to the toolholder 43. A tool 209 for turning is fixed to the member 208 by locking screws 300, 301. A cutting tip 210 is secured to the tool 209. A pipe-shaped rotation prevention member 212 projects from a projecting portion 211 of the member 208. Its channel 212a and a channel 213 of the member 208 define a connected path for cutting oil.

A spherical body 214 is mounted on the periphery of the member 208. A nozzle 214 located in the spherical body 214 is connected to the channel 213. The spherical body 214 is rotatable so that the discharge direction of a cutting oil is adjustable. It is directing toward the cutting tip 210 in FIG. 4.

When the toolholder 43 is mounted in the spindle 42, the rotation prevention member 212 is axially inserted in the block 203. Therefore the toolholder 43 can be prevented from rotating relative to the spindle 42 or the endcover 41a or the casing 41. The rotation prevention member 212 is connected to the channel 204 in the block 203.

Cutting oil stored in the cutting oil tank 200 can be discharged from the nozzle 215 via the line 205, the channel 204, the rotation prevention member 212 and the channel 213.

Figure 3:
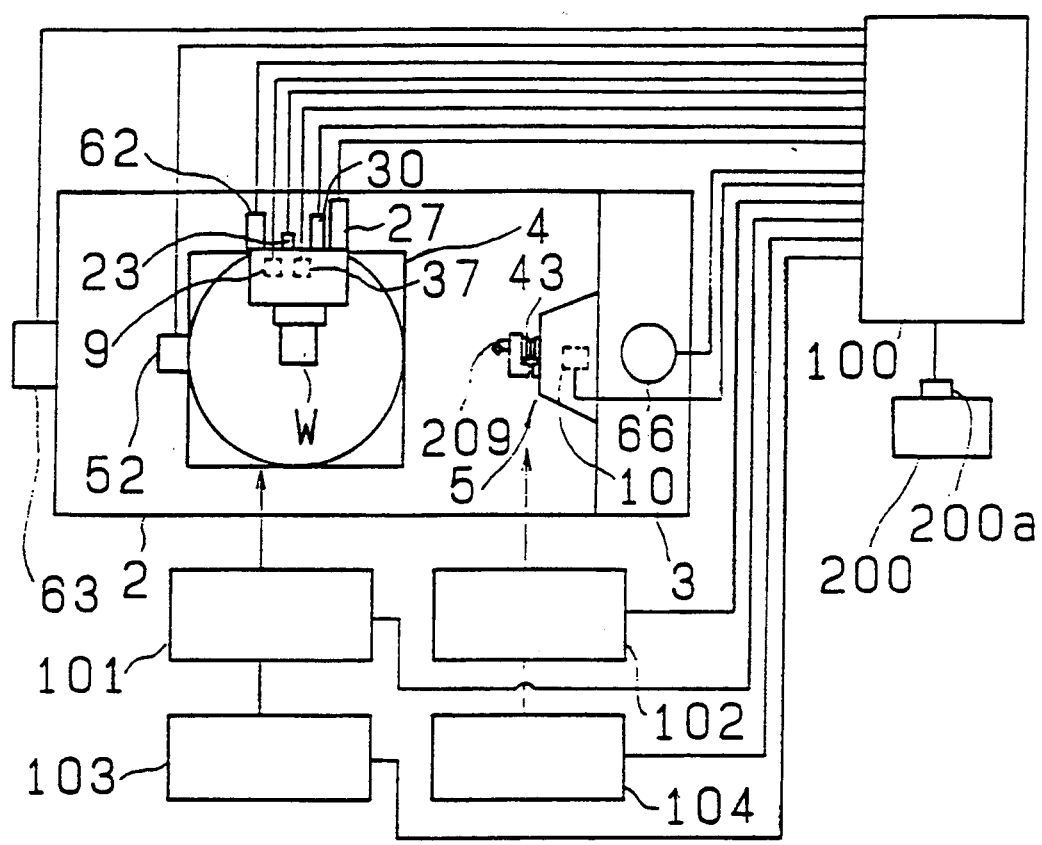
FIG. 3 is a view showing a control system.

As shown in FIG. 3, a CNC device 100 controls the motor 27, the motor 30, the first prevention part 9, the hydraulic system 23 and the motors 62, 63, 52 in connection with the workhead, the second drive part 10 and the motor 66 in connection with the toolhead 5, and a supply motor 200a in connection with the tank 200.

A changer 101 is for changing the workholder 20 attached to the workhead 4 for another workholder, while the changer 102 is for changing the toolholder 43 attached to the toolhead 5 for another toolholder. The changer 102 may be the same type as the changer 101.

A magazine 103 and a magazine 104 can each store a plurality of toolholders.

The tank 200 has a supply motor 200a for supplying a cutting oil to the line. The motor 200a is controlled by the CNC device 100.

Figure 6:
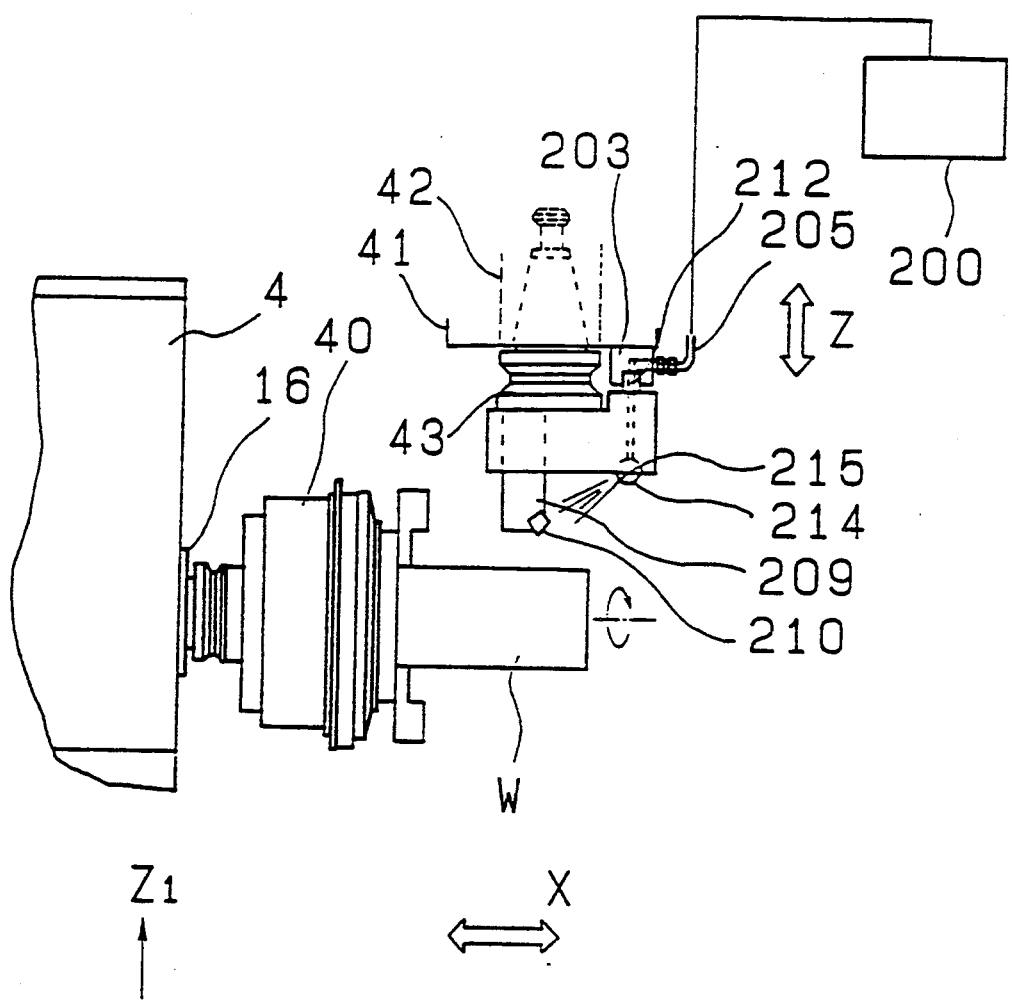
FIG. 6 is a view showing an example of a turning operation.
Figure 7:
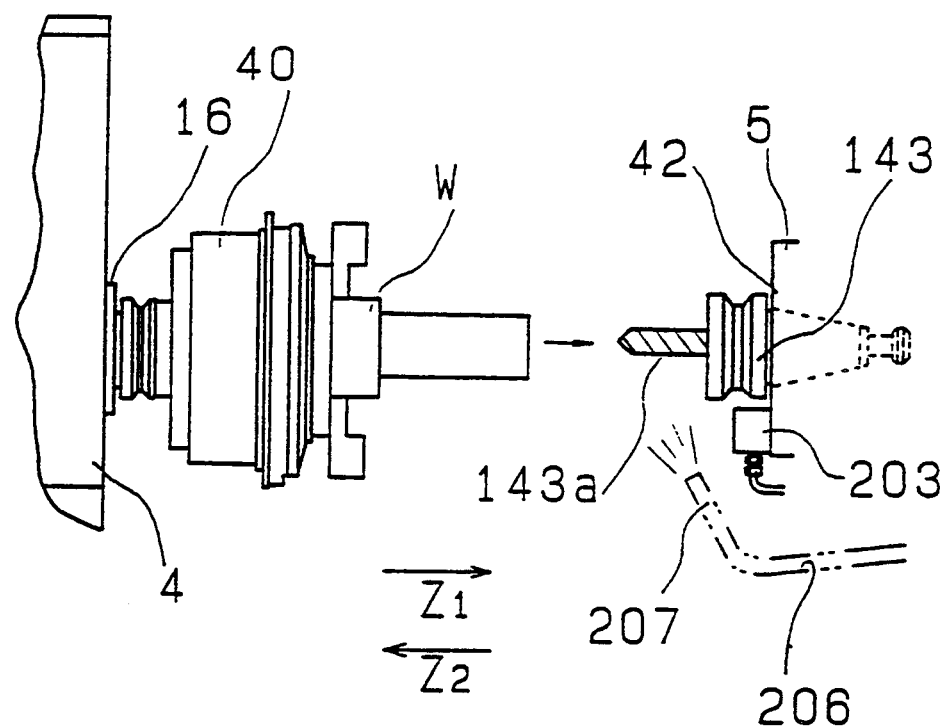
FIG. 7 is a view showing another example of a machining operation.
Figure 8:
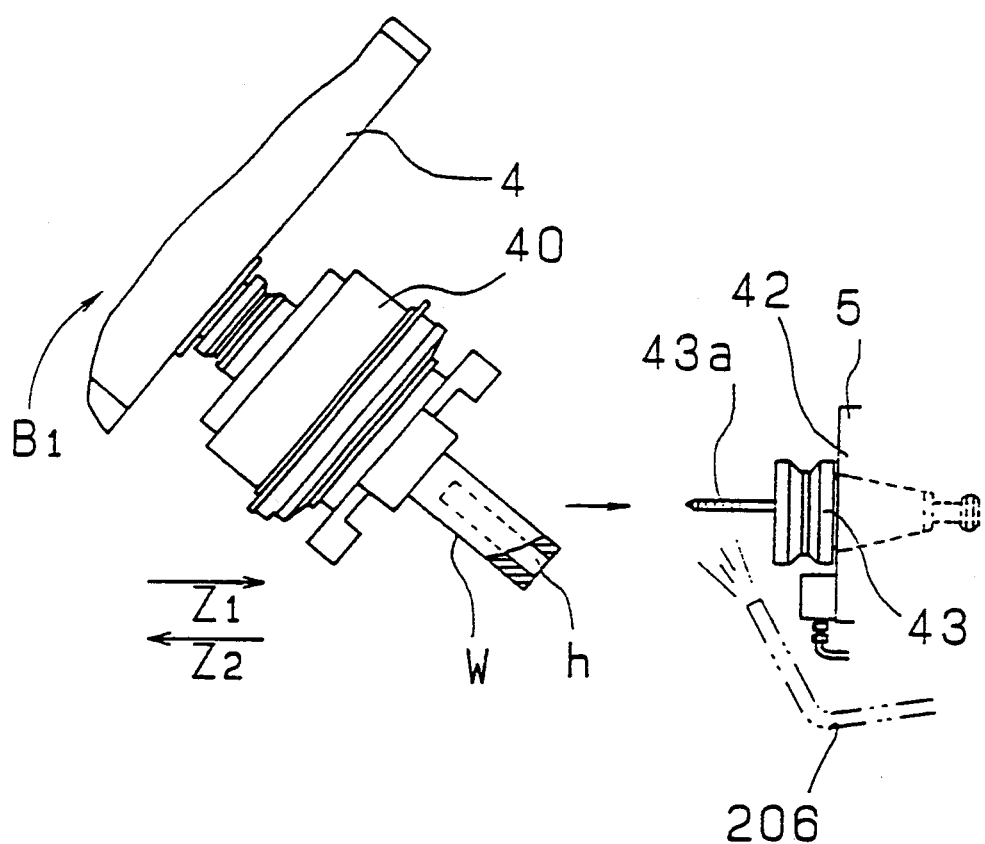
FIG. 8 is a view showing a further example of a machining operating.

FIGS. 6–8, illustrate how a workpiece W is complexly machined.

The cylindrical workpiece W is attached in the air chuck 40 of the spindle 16 in workhead 4, while the tool or bit 209 is attached to the tool holder 43.

Inserting the tool holder 43 into the spindle 42, the rotation prevention member 212 of the member 208 engages the positioning block 203 and the bit 209 is properly positioned in a peripheral direction.

The periphery of workpiece W is removed by turning with the bit 209 while the spindle is continuously rotated and simultaneously the workhead 4 is moved in a direction z1 and also cutting oil is discharged from the nozzle 215 as shown in FIG. 6.

Referring to FIG. 7, the toolholder 43 shown in FIG. 6 is changed for another toolholder 143. This toolholder 143 has a drill 143a. The drill 143a faces an end face of the workpiece W in workholder 40.

First the spindle 16 is prevented from rotating, then the workholder 4 is moved in a direction z1 while the spindle 42 is continuously rotated. Therefore the workpiece is drilled and an axial hole h is formed therein (FIG. 9) while cutting oil is discharged via the line 206.

Figure 9:
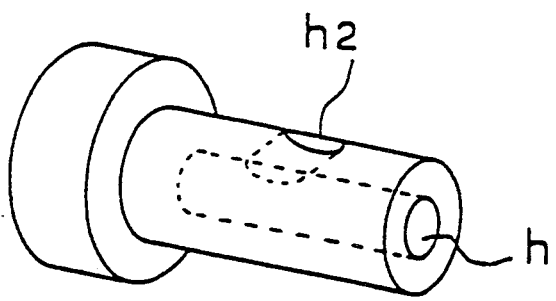
FIG. 9 is a view showing a workpiece machined.
Figure 10:
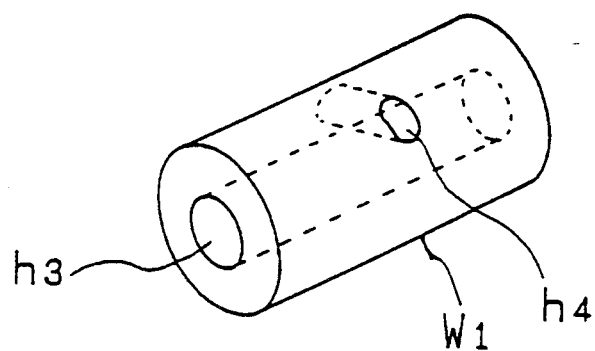
FIG. 10 is a view showing another workpiece machined.
Figure 11:
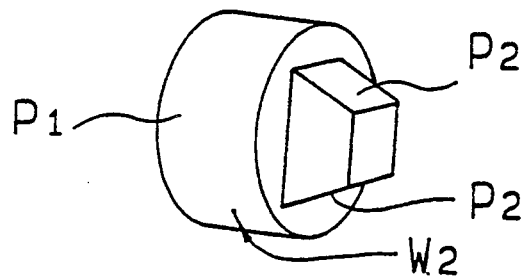
FIG. 11 is a view showing a further machined workpiece.
Figure 12:
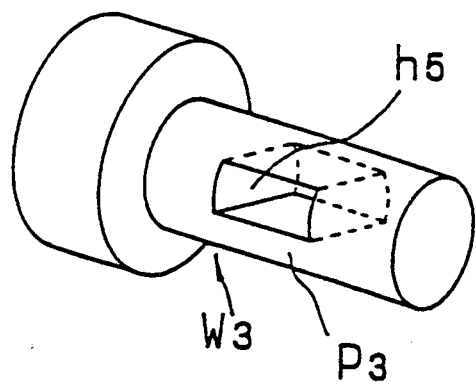
FIG. 12 is a view showing a still further workpiece machined.

Then the workhead 4 is returned in direction z2 in FIG. 7. The workhead 4 is indexed in a direction B1 as shown in FIG. 8. Thereafter the workhead 4 is moved in direction z1 and a hole h2 is formed in the workpiece W as shown in FIG. 9. The axes of the hole h and h2 are crossed at a predetermined angle with each other. A cutting oil is also supplied via the line 206. Referring to FIGS. 10–12, other workpiece examples are explained.

The workpiece shown in FIG. 10 has two holes formed therein. Two holes h3 and h4 are crossed at right angles.

The workpiece shown in FIG. 11 has a cylindrical portion P1 and inclined flat faces P2.

The workpiece W3 shown in FIG. 12 has a hole h5 formed in its small cylindrical portion P3.

This invention is not restricted to the previously described embodiments.

For example, in FIG. 6 the member 208 may be formed integral with the tool holder 43. The line 206 may be omitted and, instead, in the machining operation shown in FIG. 8 or 7, a cutting oil can be directly discharged from the positioning member 203 onto the tool or the workpiece.

The toolhead 5 shown in FIG. 1 can be constructed so as to move in a direction x or z relative to the workhead 4. Not only drilling but tapping, milling and so on can be also performed with corresponding tools after turning.

In a machine tool according to the invention, the spindle is constructed so as to receive not only a rotary type toolholder but a non-rotary type toolholder. In the latter case the spindle can be prevented from rotating relative to the spindle support, and simultaneously a cutting oil can be supplied during machining operation. Therefore, a turning can be continuously performed with a non-rotary type tool inserted in the spindle without seizure. And if the workholder is only set into the spindle, the tool can be positioned in a rotational direction.

In a machine tool according to this invention, once the rotation prevention means is attached, the supply channel is formed by the rotation prevention means.

I claim:

1. A machine tool comprising:
   a frame;
   a stationary spindle support mounted on said frame;

a spindle rotatably mounted in said spindle support for receiving a toolholder;

a toolholder releasably mounted in said spindle;

a tool mounted in said toolholder;

stop means for preventing said toolholder and said tool from rotating relative to said spindle support; and cutting oil supply means, including a conduit extending through said stop means, for supplying cutting oil to said tool mounted in said tool holder.

2. A machine tool according to claim 1, wherein said stop means comprises:

a tool mounting member for attaching said tool to said toolholder;

a positioning member fixed to said spindle support; and a stop member fixed to and extending from said tool mounting member for engaging said positioning member to hold said toolholder stationary relative to the spindle support.

3. A machine tool according to claim 2, wherein said cutting oil supply means further includes a cutting oil discharge nozzle mounted on said tool mounting member.

4. A machine tool according to claim 3 wherein said nozzle is a spherical body, having an aperture extending therethrough, rotatably mounted within said tool mounting member.

5. A machine tool according to claim 1, wherein said cutting oil supply means further includes a cutting oil discharge nozzle mounted on said tool mounting member.

6. A machine tool according to claim 5 wherein said stop member is a cylindrical member with an oil conduit extending therethrough, said stop member extending axially parallel to the axis of rotation of said spindle and seating within a cylindrical recess in said positioning member upon mounting of said tool holder in said spindle, said conduit of said stop member mating with an outlet of an oil conduit extending through said positioning member, said conduits through said stop member and positioning member, in combination with a conduit through said tool mounting member, providing fluid communication between a source of cutting oil and said nozzle.

7. A machine tool according to claim 5 wherein said nozzle is a spherical body, having an aperture extending therethrough, rotatably mounted within said tool mounting member.

* * * * *